United States Patent [19]

Rapisarda

[11] Patent Number: 5,649,755

[45] Date of Patent: Jul. 22, 1997

[54] ELONGATED, DECORATIVE, FLEXIBLE, LIGHT-TRANSMITTING ASSEMBLY

[76] Inventor: Carmen C. Rapisarda, 2650 Myrtle Ave. #B-7, Monrovia, Calif. 91016

[21] Appl. No.: 603,716

[22] Filed: Feb. 20, 1996

[51] Int. Cl.⁶ ........................................ F21V 7/04
[52] U.S. Cl. ................ 362/31; 362/32; 362/103; 362/108; 362/800; 362/806
[58] Field of Search .................. 362/31, 32, 103, 362/108, 800, 806

[56] References Cited

U.S. PATENT DOCUMENTS

| | | | |
|---|---|---|---|
| 4,652,981 | 3/1987 | Glynn | 362/108 |
| 4,727,603 | 3/1988 | Howard | 362/103 |
| 4,839,777 | 6/1989 | Janko et al. | 362/108 |
| 5,366,780 | 11/1994 | Rapisarda | 362/806 |
| 5,419,061 | 5/1995 | Barrocas | 362/103 |
| 5,430,621 | 7/1995 | Raskas | 362/32 |

*Primary Examiner*—Stephen F. Husar
*Assistant Examiner*—Alfred Basichas
*Attorney, Agent, or Firm*—Edgar W. Averill, Jr.

[57] ABSTRACT

An elongated, decorative, flexible light-transmitting assembly particularly useful for adorning wearing apparel. The assembly includes a source of light having a light-transmitting area. A length of clear flexible polymer has a first end adjacent the light-transmitting area and an elongated body having an outer surface and a remote end. The length has many marks formed inwardly from the outer surface to cause the light entering the first end to be reflected in an attractive manner.

10 Claims, 2 Drawing Sheets

ELONGATED, DECORATIVE, FLEXIBLE, LIGHT-TRANSMITTING ASSEMBLY

BACKGROUND OF THE INVENTION

The field of the invention is decorative lighting and the invention relates more particularly to lighting capable of adorning wearing apparel. Numerous devices, most commonly using light-emitting diodes (L.E.D.s) are shown in the prior art. U.S. Pat. No. 2,962,580 uses snaps to hold wires which in turn hold small light bulbs to the surface of a garment. The battery is held in a pocket of the garment. U.S. Pat. No. 4,164,008 uses a flexible printed circuit board holding numerous L.E.D.s. U.S. Pat. No. 4,480,293 also uses a printed circuit sheet with L.E.D.s on a sweat shirt. U.S. Pat. No. 4,599,682 shows a fabric sleeve having L.E.D.s. The L.E.D.s are energized by a battery and are connected by wiring and both the battery and wiring are on the inner surface of the sleeve. U.S. Pat. No. 4,602,191 shows a jacket with L.E.D.s protruding from the back surface of an article of wearing apparel. U.S. Pat. No. 4,727,603 shows a garment with light conducting fibers held to the outer surface of a garment by over-stitching. The light source and a portion of the fibers are positioned on the inner surface of the garment. U.S. Pat. No. 4,774,434 shows an elaborate flexible printed circuit board utilizing L.E.D.s for decorative light sources. U.S. Pat. No. 4,774,642 and U.S. Pat. No. 4,839,777 show a garment with an electrically conductive harness which holds many L.E.D.s. Lastly, one of the present inventors is the inventor of U.S. Pat. No. 5,019,434 which shows a leather article decorated with L.E.D.s. Another patent by the named inventor is U.S. Pat. No. 5,336,780 which also utilizes L.E.D.s protruding the material of the garment with the conductive wiring on the back surface.

The problem with all of the prior art devices includes the relatively high cost of preparing and assembling the finished decorative article. Many of the prior art garments utilize opaque materials to support the light emitting members. Such opaque materials detract from the appearance of the decorated article.

BRIEF SUMMARY OF THE INVENTION

It is an object of the present invention to provide a low cost decorative article which may be easily affixed to the outer surface of an article of wearing apparel and which utilizes a single light source providing a plurality of visual light-emitting areas from the single source.

The present invention is for an elongated, decorative, flexible light-transmitting assembly comprising a source of light having a light-transmitting area. A length of clear flexible polymer has a first end adjacent the light-transmitting area and has an elongated body having an outer surface, two edges and a remote end. The body also has a thin sewing flap along the two edges. A plurality of marks are formed in the outer surface or inner surface to reflect light passing from the first end through said length. Preferably the light transmitting assembly is held entirely on the outer surface of the article. Also preferably, the flexible polymer is plasticized polyvinyl chloride. The light source is preferably an L.E.D. energized by a wafer battery held in a waterproof capsule also held on the outer surface of the garment.

DESCRIPTION OF THE PREFERRED EMBODIMENTS

Figure 1:
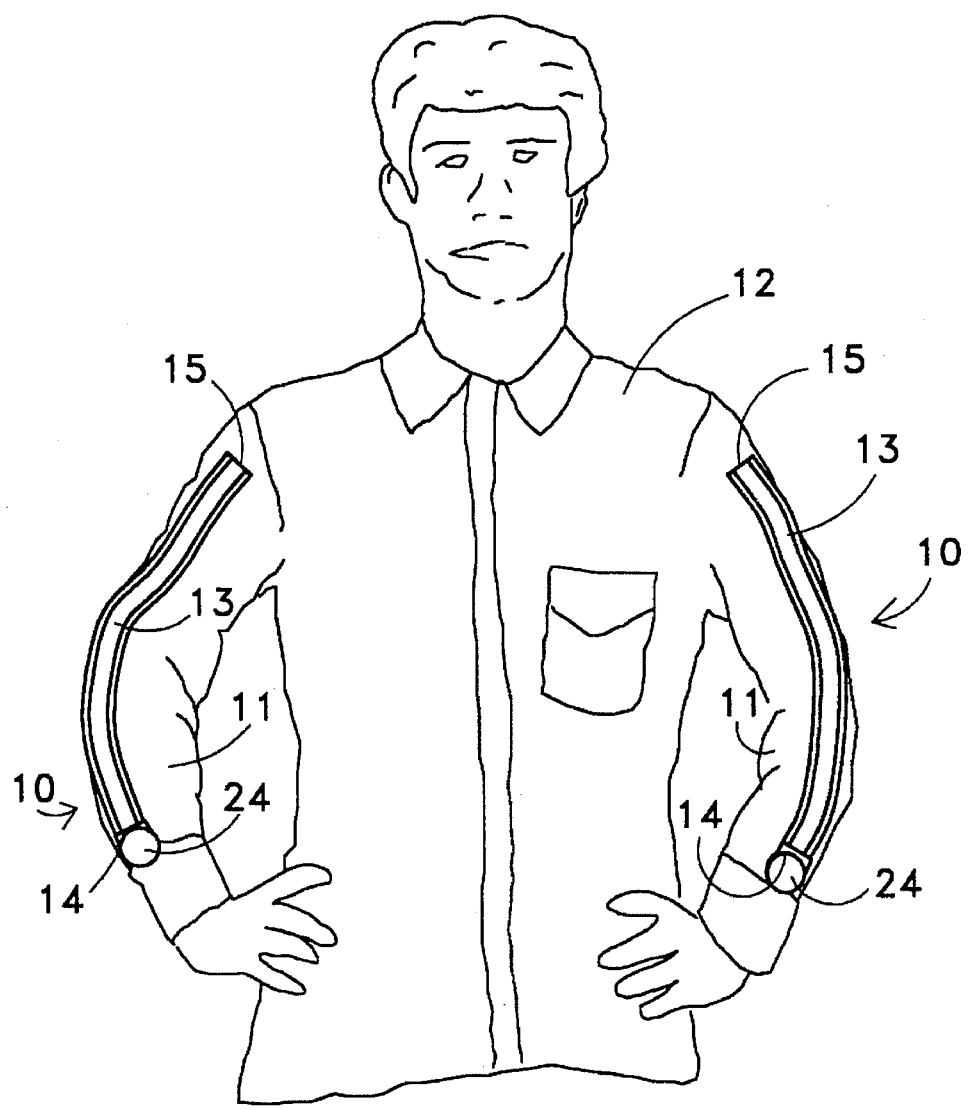
FIG. 1 is a perspective view of the light-transmitting assembly affixed to the sleeve of an article of wearing apparel.

The light-transmitting assembly 10 of the present invention is shown on the arm 11 of shirt 12. The arm may be fabricated from fabric, leather, vinyl or other flexible material used for wearing apparel and the light transmitting assembly has an elongated length 13 with a first end 14 and a remote end 15.

Figure 3:
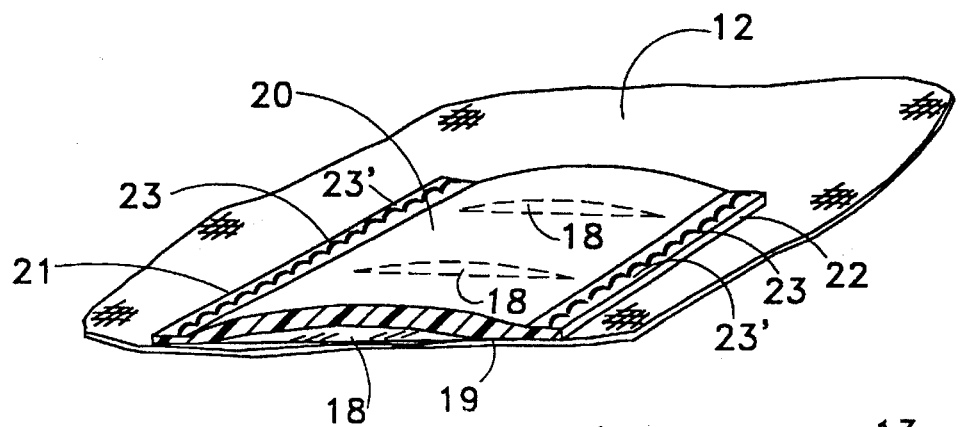
FIG. 3 is an enlarged perspective view of a portion of the length of clear flexible polymer of the light-transmitting assembly of FIG. 1.
Figure 2:
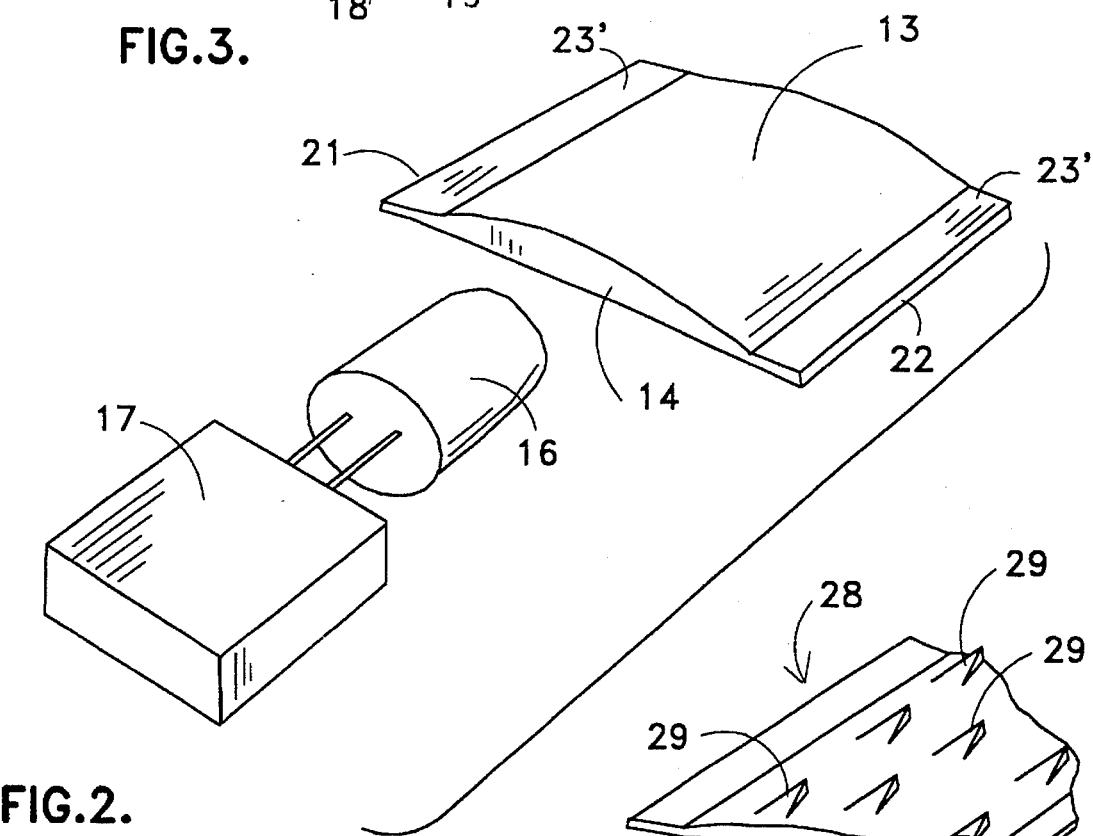
FIG. 2 is an enlarged perspective view of the light source and the first end of the light-transmitting assembly of FIG. 1.

An enlarged perspective view of the first end 14 of light-transmitting assembly 10 is shown in FIG. 2 where a light transmitting diode 16 is electrically connected to a battery and switch assembly 17. Preferably battery and switch assembly 17 is a motion energized assembly so that the device is turned off when not in use but intermittently lights during movement. Elongated length 13 is made from a clear flexible material, preferably plasticized polyvinyl chloride. As the light passes along the length 13 it is interrupted by a plurality of marks such as slits 18 shown in FIG. 3 formed from the bottom surface 19. Slits are preferred as marks as they may be economically formed. Top surface 20 is preferably convex to assist in conforming to the fabric surface as well as to provide an attractive outer surface. The shape of the body of the length of material is "generally flat". The term "generally flat" is intended to mean sufficient flat to permit one to see the fabric easily through the article. Although the outer surface is concave it is only slightly concave to help it conform to the outer surface of the garment and also to provide a smooth transition to sewing flaps 23'. The two edges 21 and 22 are preferably thinned as shown in FIG. 3 to provide sewing flats 23' to permit stitching 23 therethrough. This permits a length of light emitting material to be held on the outer surface of the garment without anything passing over the material.

Figure 5:
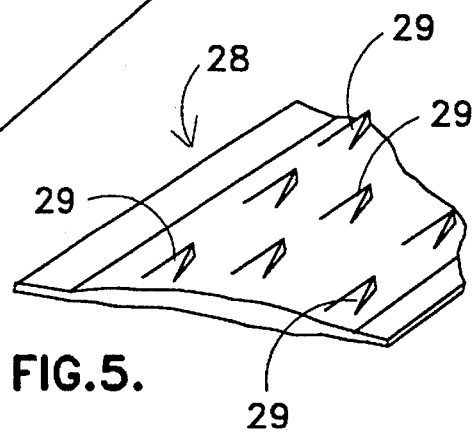
FIG. 5 is a perspective view of an alternate embodiment of the flexible polymer of the assembly of FIG. 1.

Instead of slits a surface design may be molded directly along the surface to reflect light such as shown in the length of polymer 28 in FIG. 5. A plurality of tooth shaped protrusions 29 are formed along the outer surface to provide reflecting points of light.

Figure 4:
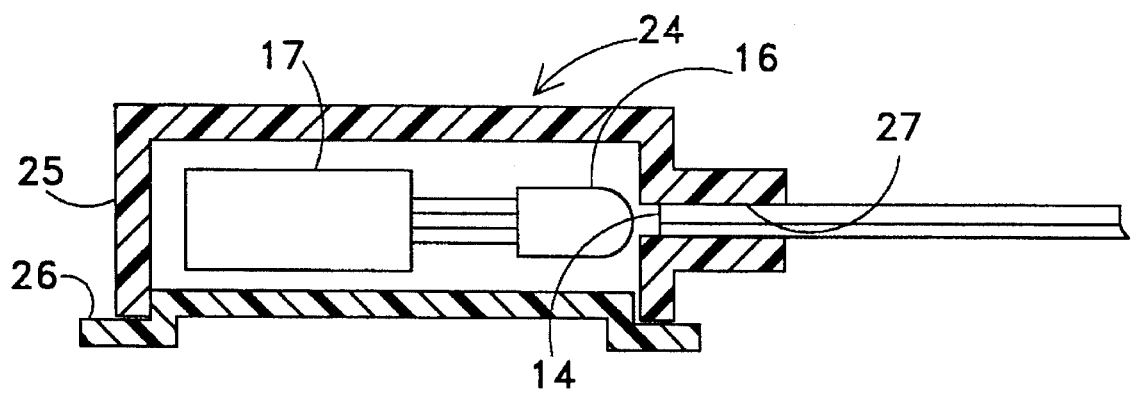
FIG. 4 is an enlarged cross-sectional view of the light source of the light-transmitting assembly of FIG. 1.

The light-emitting assembly together with the battery and switch are held in a waterproof enclosure 24 such as shown in FIG. 4 to permit laundering of the garment. This enclosure 24 may also be held on the outer surface of the garment which eliminates the expense, bulk and discomfort of placement on the inside surface. Waterproof assembly 24 has a cap 25 held to base 26. Cap 25 has an opening 27 which tightly conforms to the length 13 and this connection is preferably sealed to the length 13. Alternatively, the assembly may be potted in a waterproof material such as a silicone material.

The result of the assembly of the present invention is a very low cost assembly which appears to provide multiple light sources along its length although these are merely reflections of the single light source. While fiber optics are well known they typically provide light only at a remote end of individual fibers and thus, are not as readily utilized in apparel applications.

While slits and outer protrusions are shown as a light reflecting surface in the drawings, other light reflective means can also be used such as notches, cut or molded into the flexible length of polymer. While an L.E.D. has been shown as a light source, other light sources can also be used although the light weight and shock resistance of the L.E.D. make it the preferred light source. A wafer battery is also preferred because of its light weight and small size. The device is shown in the drawings on the arm of a shirt, but could, of course, be placed in other locations such as along the side of pant legs. While the drawings show the elongated length 13 held to the shirt 12 by sewing, it be secured in other manners. For instance it may be glued, preferably along the edges, heat sealed, riveted, stapled, or otherwise affixed, to the material.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An elongated, decorative, flexible, light-transmitting and conducting assembly comprising:

a source of light having a light transmitting area;

a length of clear, flexible polymer having a first end adjacent said light transmitting area and an elongated body having an outer surface, two edges and said length having a remote end, said length of clear, flexible polymer conducting light from its first end to said remote end;

a thin sewing flap along said two edges; and a plurality of discreet marks formed inwardly from said outer surface to reflect light passing from the first end through said length.

2. The elongated, decorative, flexible, light-transmitting assembly of claim 1 wherein said length of clear, flexible polymer has an upper surface, a lower surface and two edges and said marks comprise slits cut into said elongated body.

3. The elongated, decorative, flexible, light-transmitting assembly of claim 2 wherein said length of clear flexible polymer is mounted against a fabric surface with said lower surface adjacent said fabric and said length of clear, flexible polymer is held to said fabric by sewing through said thin sewing flaps into said garment.

4. The elongated, decorative, flexible, light-transmitting assembly of claim 3 wherein said length has a convex upper surface.

5. The elongated, decorative, flexible, light-transmitting assembly of claim 1 wherein said clear, flexible polymer is plasticized polyvinyl chloride.

6. The elongated, decorative, flexible, light-transmitting assembly of claim 1 wherein said source of light includes a light emitting diode.

7. The elongated, decorative, flexible, light-transmitting assembly of claim 6 wherein said light emitting diode is electrically connectable to a battery and said battery and said light emitting diode are contained in a waterproof compartment adjacent said first end.

8. The elongated, decorative, flexible, light-transmitting assembly of claim 1 wherein said source of light is an intermittent source of light initiated by movement of said source of light.

9. A decorative article affixed to an outer surface of an article of apparel, said decorative article comprising:

a length of clear, flexible plasticized polyvinyl chloride having a first end, a remote end, two elongated edges, an elongated body having an outer surface and an apparel contacting surface and said elongated body being generally flat; and a motion sensitive light transmitting capsule affixed adjacent said first end, said light transmitting capsule including a light emitting diode aimed at said first end and a battery, said light transmitting capsule having a waterproof interior, said length of clear, flexible plasticized polyvinyl chloride conducting light from its first end to its remote end and forming the outer surface of said decorative article without the need of an external covering.

10. The decorative article of claim 9 wherein said motion sensitive light transmitting capsule is affixed to the outer surface of said garment.

* * * * *